(12) United States Patent
Kim et al.

(10) Patent No.: US 12,367,035 B2
(45) Date of Patent: Jul. 22, 2025

(54) METHOD OF IMPLEMENTING SOFTWARE ARCHITECTURE FOR COMMON USE OF WAYLAND PROTOCOL

(71) Applicant: HYUNDAI MOBIS CO., LTD., Seoul (KR)

(72) Inventors: Won Ho Kim, Yongin-si (KR); Gu Hwan Bae, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 462 days.

(21) Appl. No.: 18/147,486

(22) Filed: Dec. 28, 2022

(65) Prior Publication Data
US 2023/0289179 A1 Sep. 14, 2023

(30) Foreign Application Priority Data
Mar. 10, 2022 (KR) .......................... 10-2022-0030197

(51) Int. Cl.
*G06F 8/71* (2018.01)
*G06F 9/54* (2006.01)

(52) U.S. Cl.
CPC ................. *G06F 8/71* (2013.01); *G06F 9/541* (2013.01); *G06F 2209/545* (2013.01)

(58) Field of Classification Search
CPC ....... G06F 8/71; G06F 9/541; G06F 2209/545
USPC .......................................................... 719/328
See application file for complete search history.

(56) References Cited

U.S. PATENT DOCUMENTS

| | | | | |
|---|---|---|---|---|
| 5,649,216 A | * | 7/1997 | Sieber | G06T 11/60 715/234 |
| 5,852,435 A | * | 12/1998 | Vigneaux | G06F 16/40 345/428 |
| 9,053,235 B1 | * | 6/2015 | Bienkowski | G06F 11/3698 |
| 11,782,406 B2 | * | 10/2023 | Krishnamurthy | G05B 15/02 719/328 |
| 2021/0303271 A1 | * | 9/2021 | Hicklin | G06F 8/33 |

* cited by examiner

*Primary Examiner* — Chat C Do
(74) *Attorney, Agent, or Firm* — DLA PIPER LLP US

(57) ABSTRACT

A method of implementing software architecture for common use of a Wayland protocol in a graphics module, including an application layer, an application programming interface (API) layer, a GDBus layer, a layout service layer, a Wayland protocol layer, a Weston layer, and a kernel layer, is provided. The method includes integrating the GDBus layer, relaying communication between the API layer and the layout service layer, into the Wayland protocol layer relaying communication between the layout service layer and the Weston layer and changing the layout service layer, providing a service determining and managing an application which is to be displayed on a screen, to a WindowManagerService module performing a function based on a policy of Window.

7 Claims, 4 Drawing Sheets

METHOD OF IMPLEMENTING SOFTWARE ARCHITECTURE FOR COMMON USE OF WAYLAND PROTOCOL

CROSS-REFERENCE TO RELATED APPLICATIONS

This application claims the benefit of the Korean Patent Application No. 10-2022-0030197 filed on Mar. 10, 2022. The entirety of the above-listed application is incorporated herein by reference.

BACKGROUND

Field of the Invention

The present invention relates to a method of implementing software architecture for common use of Wayland protocol in a display electronic device included in a vehicle.

Discussion of the Related Art

Graphics modules, such as Wayland and Weston which are open sources supported by Linux operating system (OS), are most used in all automobile industry and application process (AP) Vendor generally. In the AP Vendor, based thereon, a graphics module test is performed in distributing a version.

Relevant graphics modules have dependence on HW graphics library. However, there are many cases where a scenario of a customer collides with a spec criterion, this is an appointment which should be unconditionally kept with a customer, but there is no module which controls the appointment in the middle. That is, this denotes that a graphics function is used in common and there is no module which has a modularization function.

If there is such a module, personnel and resources invested therein may be reduced by directly correcting HW vendor. There is no history where a competitor of the applicant applies the personnel and resources to real mass production. This is because this is the difficult field and it is not easy to secure the stability of mass production. Such a module may directly affect performance, and thus, the need for optimization thereof is always emphasized.

Problem of the Related Art

A graphics module (Weston/Wayland) which is an open source supported by Linux OS is applied with dependency of a function-based library provided by HW vendor company for each produced vehicle model.

A function of a graphics portion is defined and used based on Wayland protocol which is Wayland-based IPC, but in the related art, it is much difficult to respond to each vehicle model because the portion differs for each AP. Also, there is a problem where a number of resources are invested in different portions for each AP in scenario application and version updating specified for own company, and additional development is being unconditionally performed generally.

SUMMARY

An aspect of the present invention is directed to providing an apparatus and method for accomplishing the following objects.
1. Development for the common use of graphics module for avoiding dependence on AP
1-1. Designing of a common-use graphics interface for defining functions of a graphics-linked service and App
1-2. Implementation for the common use of graphics protocol for communication between a graphics module, a link service, and App
2. Development for modularization of internal additional function of Weston
2.1 Designing and implementation of a module (WindowPolicyManager) which manages and sets the policy of Window
2.2 Designing and implementation of a module (WindowManagerService) which executes a function on the basis of the policy of Window The objects of the present invention are not limited to the aforesaid, but other objects not described herein will be clearly understood by those skilled in the art from descriptions below.

To achieve these and other advantages and in accordance with the purpose of the invention, as embodied and broadly described herein, there is provided a method of implementing software architecture for common use of a Wayland protocol in a graphics module including an application layer, an application programming interface (API) layer, a GDBus layer, a layout service layer, a Wayland protocol layer, a Weston layer, and a kernel layer, the method including: integrating the GDBus layer, relaying communication between the API layer and the layout service layer, into the Wayland protocol layer relaying communication between the layout service layer and the Weston layer; and changing the layout service layer, providing a service determining and managing an application which is to be displayed on a screen, to a WindowManagerService module performing a function based on a policy of Window.

In an embodiment, the integrating of the GDBus layer may include adding a GDBus interface of the GDBus layer to the Wayland protocol layer.

In an embodiment, as the GDBus interface is added to the Wayland protocol layer, the GDBus layer is removed in the graphics module.

In an embodiment, the changing of the layout service layer may include: implementing the WindowManagerService module to have a function-based function structure provided in the layout service layer; and adding the implemented WindowManagerService module to the Weston layer.

In an embodiment, as the WindowManagerService module is implemented to have a function-based function structure provided in the layout service layer, the layout service layer may be removed in the graphics module.

In an embodiment, the method may further include adding a WindowPolicyManager module, generalizing, defining, and managing the policy of Window which differs in each manufacturer, to a Weston layer.

In another aspect of the present invention, there is provided a graphics module based on Wayland and Weston and implemented with software architecture for common use of a Wayland protocol, including an application layer module, an application programming interface (API) layer module, a Wayland protocol layer module, a Weston layer module, and a kernel layer module, the graphics module is characterized in that the Wayland protocol layer module is an inter-process communication (IPC) for relaying communication between the API layer module and the Weston layer module and includes a GDBus interface, and the Weston layer module includes a WindowManagerService module including a module configured to execute a function based on a policy of Window.

In an embodiment, the WindowManagerService module may be a module into which a layout service layer module designed in a conventional graphics module based on Wayland and Weston is integrated.

In an embodiment, the WindowManagerService module may be implemented to have a function-based function structure provided in the layout service layer module.

In an embodiment, the Weston layer module may further include a WindowPolicyManager module generalizing, defining, and managing the policy of Window which differs in each manufacturer.

In an embodiment, the policy of Window may include policies associated with screen updating, touch recognition, and key event recognition which differ in each manufacturer.

In an embodiment, the Wayland protocol layer module may be a module integrated into a GDBus layer module which relays communication between a layout service layer module and an API layer module designed in a conventional graphics module based on Wayland and Weston.

It is to be understood that both the foregoing general description and the following detailed description of the present invention are exemplary and explanatory and are intended to provide further explanation of the invention as claimed.

DETAILED DESCRIPTION OF THE INVENTION

Figure 1:
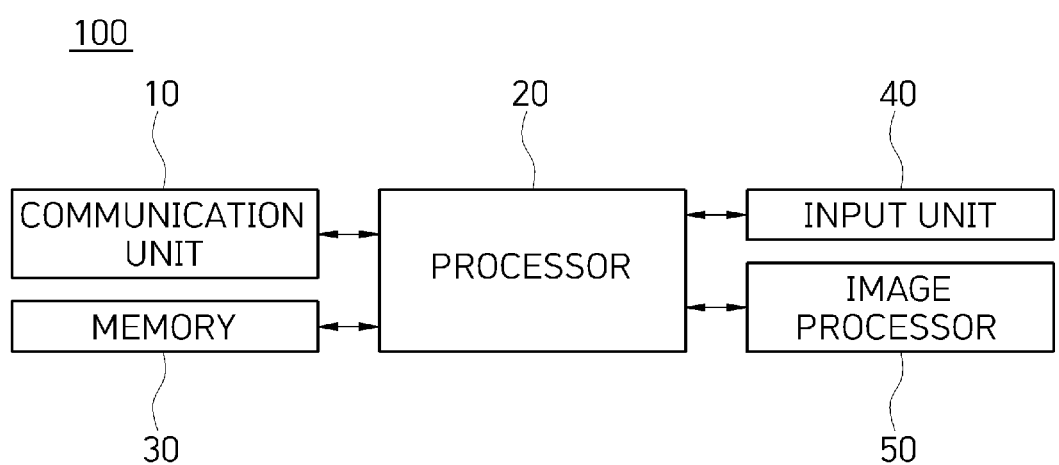
FIG. 1 is a block diagram of a display electronic device for implementing software (SW) architecture for the common use of a Wayland protocol according to an embodiment of the present invention.

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity. Like reference numerals refer to like elements throughout. Also, in providing description with reference to the drawings, although elements are represented by the same name, reference numeral referring to the elements may be changed, and reference numerals are merely described for convenience of description. It should not be construed that concepts, features, functions, or effects of elements are limited by reference numerals.

DESCRIPTION OF TERMS

Wayland

Wayland may be defined as a protocol representing communication between software layers configuring a graphics system or a client and a server in the graphics system. The present invention may provide a method for the common use of a Wayland protocol which differs in each manufacturer.

Weston

Weston may implement a Wayland protocol and a Wayland compositor.

Weston may provide a function of supporting (desktop-shell, xdg-shell . . . ) a shell plugin. Here, desktop shell may be defined as plugin which supports a keyboard/mouse interface and a Window manager such as conventional desktop, and for example, may support the lock of a wallpaper, a panel, or a screen. Also, xdg-shell may be defined as plugin which moves a position of Window and adjusts Window size, or supports a function of changing a screen to a full screen.

Moreover, Weston may provide a function which classifies windows into a plurality of layers and manages the windows, like mouse cursor view, App1 view, and App2 view.

Moreover, Weston may provide a function of determining the order of windows (views) displayed by using a shell.

Moreover, Weston may provide a function which allows a window to be displayed on a screen or moves a position or changes a size.

Wayland Compositor

A Wayland compositor may provide a function which combines and displays all windows, overlapping one another on a screen, on one screen.

Shell

A shell may define a policy for managing the output and order of windows and may include a life cycle of a window and a window managing function. Also, the shell may provide a function which moves a window or changes a size and displays a panel or a wallpaper. Also, the shell may determine (click, drag, or maximize/minimize a mouse) a position and a size in all window screens.

In-Vehicle Infotainment (IVI)-Shell

An IVI-shell may denote plugin which maps a surface (wl_surface) of Wayland to an IVI-application protocol and supports a function of managing a surface, a layer, and a screen.

In the IVI-shell, IVI may denote a usable environment, and the shell may manage the output and order of windows. That is, the IVI-shell may be a library which outputs a window and designates an order, based on an IVI environment.

FIG. 1 is a block diagram of a display electronic device for implementing software (SW) architecture for the common use of a Wayland protocol according to an embodiment of the present invention.

Referring to FIG. 1, a display electronic device 100 (hereinafter referred to as an electronic device) for the common use of a Wayland protocol may be provided in a vehicle so as to provide information to an in-vehicle driver.

In various embodiments, the electronic device 100 may be a device which is embedded and fixed in a vehicle. For example, the electronic device 100 may be a computing device which is inserted into a vehicle through tuning after a production process.

In various embodiments, the electronic device 100 may be a device which provides an IVI service to an output device (for example, a display or a speaker) which is embedded in a vehicle.

In various embodiments, the electronic device 100 may be implemented with, for example, a cluster device, an audio/video/navigation (AVN) device, a head-up display (HUD) device, and a navigation device, which display driving information about a vehicle.

Moreover, the electronic device 100 may be a device which has mobility and is arbitrarily fixed in a vehicle. In this case, for example, the electronic device 100 may be one of a smartphone, a tablet personal computer (PC), a laptop computer, and a computer program product including a universal serial bus (USB) port, which may be fixed to or attached on a vehicle through an embedded connector.

The electronic device 100 may include a communication unit 10, a processor 20, a memory 30, an input unit 40, and an image processor 50.

The electronic device 100 may further include various elements such as a display unit (not shown), an audio processor (not shown), an audio output unit (not shown), and a power unit (not shown), in addition to the elements illustrated in the embodiment of FIG. 1.

Moreover, it is not limited that the electronic device 100 is implemented with all of the elements illustrated in FIG. 1.

The communication unit 10 may receive an image signal through various sources. For example, the communication unit 10 may receive broadcast data from an external broadcasting station, or may receive streamed image data from an external server.

The communication unit 10 may include, for example, a communication chip which operates based on wired local area network (LAN), wireless LAN, WiFi, Bluetooth (BT), or near field communication (NFC).

The memory 30 may store various modules, software, and data for driving the electronic device 100. For example, Linux operating system (OS), middleware, an application, an application programming interface (API), a graphics driver, and a library associated with a screen element.

The memory 30 may be implemented as a type such as flash memory or hard disk. For example, the memory 130 may include read only memory (ROM) for storing a program for performing an operation of the electronic device 100 and random access memory (RAM) for temporarily storing data based on performing an operation of the electronic device 100. Also, the memory 130 may further include electrically erasable and programmable ROM (EEPROM) for storing various reference data.

The input unit 40 may receive various user commands for controlling the electronic device 100. The input unit 40 may be implemented with a button or a touch pad, or may be implemented with a separate device such as a remote control device.

In a case where the electronic device 100 is implemented as including the display unit (not shown), the input unit 40 may be coupled to the display unit (not shown) and implemented as a touch screen. The touch screen may detect a touch input position, an area, and pressure of the touch input.

The image processor 50 may perform image processing on data processed by the processor 20 or image data received from the communication unit 10. The image processor 50 may perform various image processing, such as scaling, noise filtering, frame rate conversion, and resolution conversion, on image data. The image processor 50 may be implemented with, for example, one graphics processing unit (GPU) or a plurality of GPUs.

The processor 20 may control the elements of the electronic device 100 described above. The processor 20 may be implemented with one central processing unit (CPU) or a plurality of CPUs.

In FIG. 1, the processor 20 and the image processor 50 are illustrated as a split type, but may be provided as one body. For example, the image processor 50 may be integrated into the processor 120. In this case, the processor 20 may be implemented to include at least one CPU and/or at least one GPU.

Figure 2:
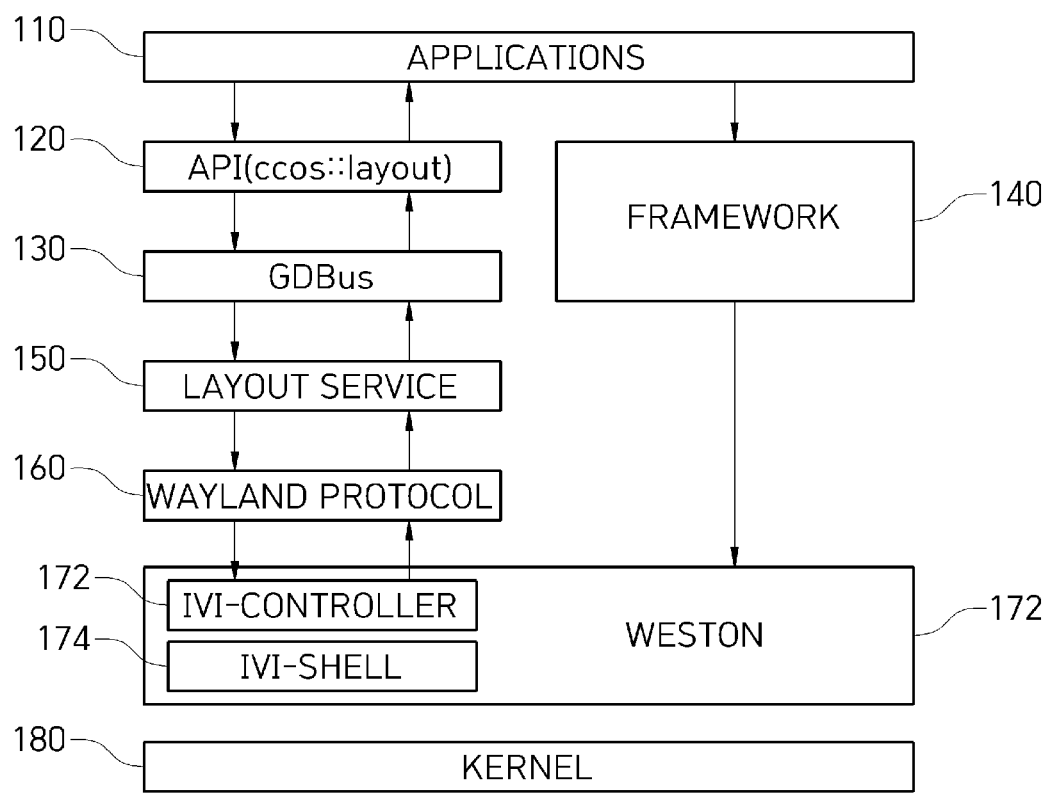
FIG. 2 is a diagram for describing conventional software architecture associated with a graphics module based on Wayland and Weston, which is an open source supported by Linux OS implemented by the display electronic device illustrated in FIG. 1.

FIG. 2 is a diagram for describing conventional software architecture associated with a graphics module based on Wayland and Weston, which is an open source supported by Linux OS implemented by the display electronic device illustrated in FIG. 1.

Referring to FIG. 2, conventional software architecture may include a plurality of software layers executed and/or implemented by the processor 120 illustrated in FIG. 1.

In detail, as illustrated in FIG. 2, the conventional software architecture may include an application (App) layer module 110, an API layer module 120, a GDBus layer module 130, a framework layer module 140, a layout service layer module 150, a Wayland protocol layer module 160, a Weston layer module 170, and a kernel layer module 180.

Such software layers 110 to 180 may be software layers which are executed and implemented in Linux OS executed by the processor 120 illustrated in FIG. 1.

The application layer 110 may include a plurality of applications executed in a client. An application configuring the application layer 110 may be, for example, a HMI controller, a car navigation, a rear view camera, or a media player.

The application layer 110 may communicate with the API layer 120 configuring a lower layer thereof and may transfer and receive various information therebetween. For example, the application layer 110 may generate information associated with a changed layout and a key event and may transfer the generated information to the API layer 120.

Moreover, the application layer 110 may generate a window surface and may transfer the window surface to the framework layer 140 configuring a lower layer thereof. Here, the window surface may denote a rectangular region displayed on a screen.

The information associated with the window surface may include, for example, position information, size information, and pixel information.

The API layer 120 may be an interface which receives information associated with a key event and a layout changed event associated with a layout transferred from the layout service layer 150 through the GDBus layer 130 and controls a function provided in an upper or lower layer thereof.

The GDBus layer 130 may be an inter-process communication (IPC) layer for relaying communication between a process of the API layer 120 and a process of the layout service layer 150.

The framework layer 140 may be a layer which controls generating, loading, and visibility of the window surface.

The layout service layer 150 may generate control information associated with a service which determines and manages an application which is to be displayed on a screen, based on information transferred from the API layer 120 through the GDBus layer 130, and may transfer the generated control information to the Weston layer 170 through the Wayland protocol layer 160 configuring a lower layer thereof.

Here, the control information may include screen information (screens Info), layer information (Layer Info), layout information (Layouts Info), and window information (Windows Infor).

The screen information may include information associated with a color and transparency of the window surface and information associated with a resolution and a scan rate of a physical screen.

The layer information may include information associated with an order (for example, z order) of a window surface, and for example, may include pieces of information for determining window surfaces of an uppermost layer, a middle layer, and a lowermost layer among window surfaces overlapping one another. Also, the layout service layer 150 may receive a surface callback transferred from the Weston layer 170 through the Wayland protocol layer 160.

The Wayland protocol layer 160 may be an IPC layer for relaying communication between a process performed in the layout service layer 160 and a process performed in the Weston layer 170.

The Wayland protocol layer 160 may define a Wayland protocol which differs in each chip company, and the present invention described below may provide a software layer structure which may be generalized the integration and common use of Wayland protocols which are differently defined in each chip company.

The Weston layer 170 may communicate with the layout service layer 150 through the Wayland protocol layer 160 and may include an IVI-controller 172 and an IVI-shell 174.

The IVI-controller 172 may perform a window management function which is provided in a Wayland IVI extension project, and for example, may manage IVI surfaces properties, ivi layers, and ivi screen.

The kernel layer 180 may support a driver so as to enable recognition of a monitor. Also, the kernel layer 180 may control or manage system resources (for example, the processor 20, the memory 30, etc.) used to execute an operation or a function implemented in the layers 110 to 170.

Figure 3:
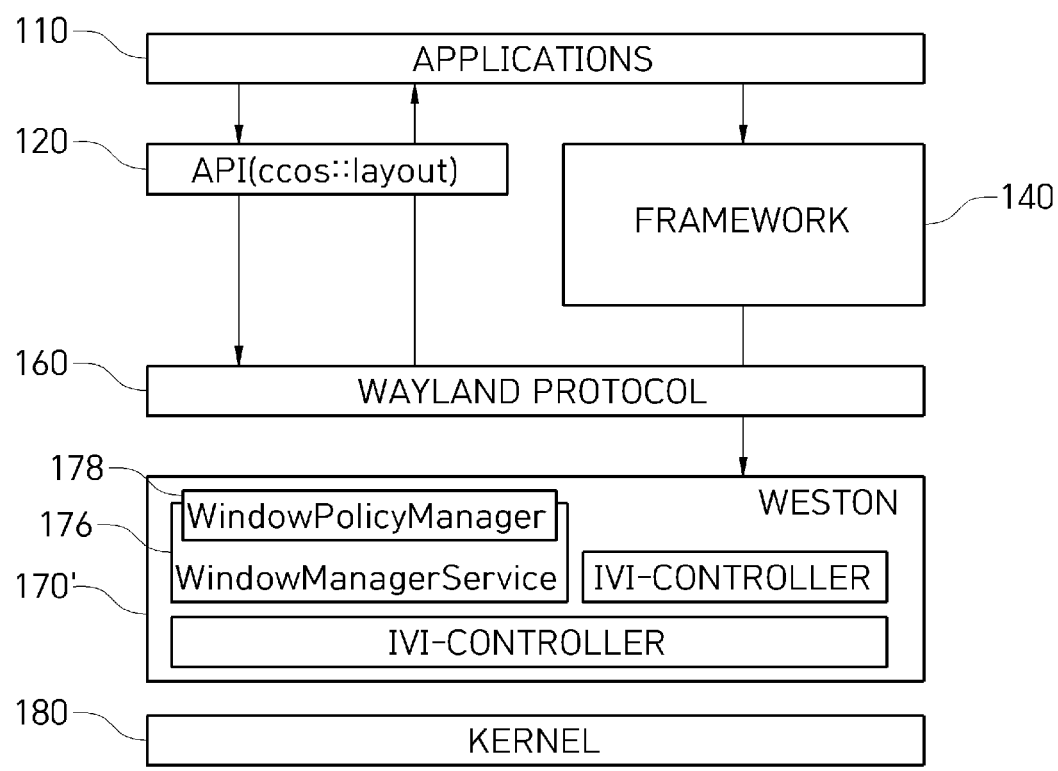
FIG. 3 is a diagram for describing software architecture changed from the conventional software architecture illustrated in FIG. 1, according to an embodiment of the present invention.

FIG. 3 is a diagram for describing software architecture changed from the conventional software architecture illustrated in FIG. 1, according to an embodiment of the present invention.

Referring to FIG. 3, software architecture according to an embodiment of the present invention changed from the conventional software architecture may include an application layer 110, an API layer 120, a framework 140, a Wayland protocol layer 160', a Weston layer 170', and a kernel layer 180.

The software architecture according to an embodiment of the present invention may be characterized by integrating Wayland protocols which differ in each manufacturer.

In detail, comparing with the conventional software architecture, in the software architecture according to an embodiment of the present invention, an IPC layer referred to as the GDBus layer 130 illustrated in FIG. 1 may be deleted, and the deleted GDBus layer 130 may be integrated into an IPC layer referred to as the Wayland protocol layer 160'. Such an integration process may be a process of deleting a GDBus interface provided in the GDBus layer 130 and adding the deleted GDBus interface to a Wayland protocol.

Moreover, comparing with the conventional software architecture, in the software architecture according to an embodiment of the present invention, the layout service layer 150 illustrated in FIG. 1 may be deleted, and the deleted layout service layer 150 may be integrated into a WindowManagerService module 176 included in the Weston layer 170'.

The WindowManagerService module 176 may be a module which performs a function on the basis of the policy of Window, and the layout service layer 150 may be integrated into the WindowManagerService module 176, whereby a structure of a function-based function based on the policy of Window in the layout service layer 150 may move to the WindowManagerService module 176.

Moreover, comparing with the conventional software architecture, in the software architecture according to an embodiment of the present invention, the Weston layer 170' may further include a WindowPolicyManager module 178 which generalizes, defines, and manages the policy of Window which differs in each AP. That is, the WindowPolicyManager module 178 may be added as a separate library to the Weston layer 170', and thus, an end user may flexibly respond to various App scenarios (localization scenarios), and thus the cost for changing a version may be reduced.

Figure 4:
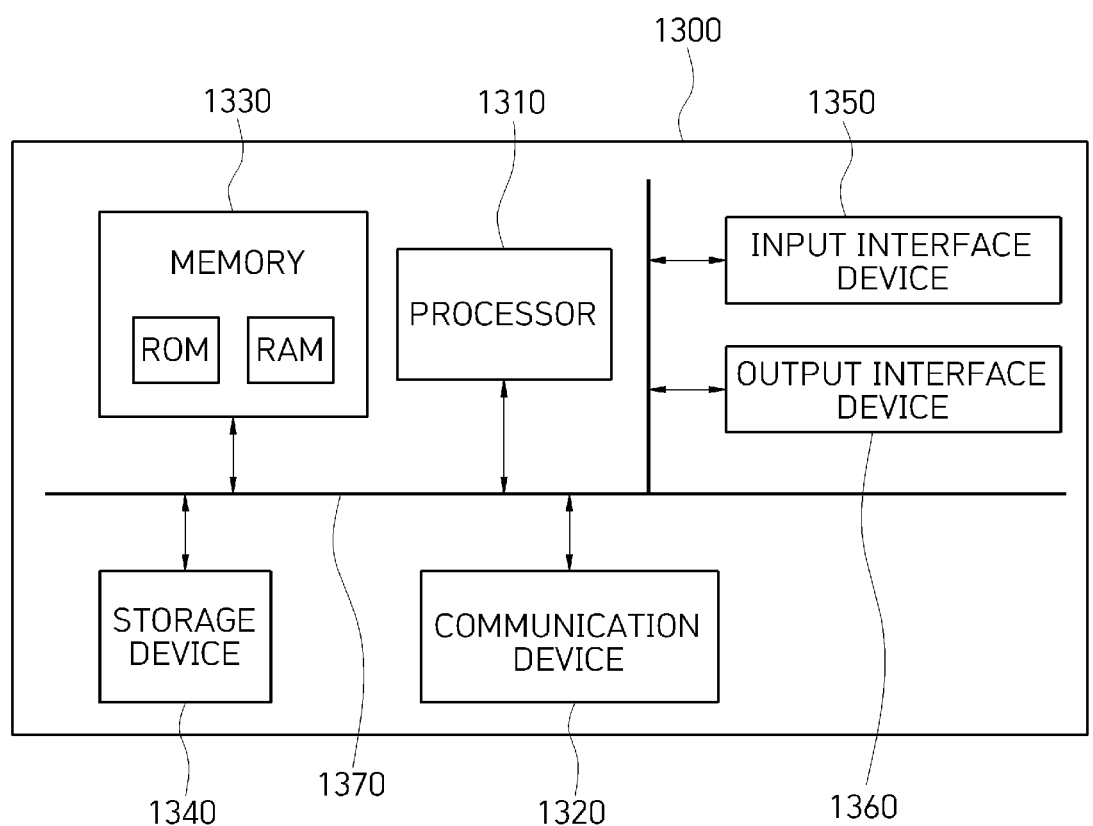
FIG. 4 is a block diagram of a computer system for implementing software architecture for the common use of a Wayland protocol, according to an embodiment of the present invention.

FIG. 4 is a block diagram of a computer system 1300 for implementing software architecture for the common use of a Wayland protocol, according to an embodiment of the present invention.

Referring to FIG. 4, the computer system 1300 may include various hardware elements for implementing software architecture for the common use of a Wayland protocol. For example, the computer system 1300 may include at least one of a processor 1310, a memory 1330, an input interface device 1350, an output interface device 1360, and a storage device 1340, which communicate with one another through a bus 1370. The computer system 1300 may include a communication device 1320 coupled to a network.

The communication device 1320 may include hardware elements configured to support mobile communication such as wired/wireless Internet, 3G, LTE, 4G, and 5G, WiFi, Bluetooth, LPWAN, and GPS. The processor 1310 may be a CPU, a GPU, an MCU, or a system on chip (SoC), or may be a semiconductor device which executes an instruction stored in the memory 1330 or the storage device 1340. The memory 1330 and the storage device 1340 may each include various types of volatile or non-volatile storage mediums. For example, the memory 1330 may include ROM and RAM. In an embodiment of the present invention, the memory 1330 may be provided in or outside a processor and may be connected to the processor through various means known to those skilled in the art. The memory 1330 may be various types of volatile or non-volatile storage mediums, and for example, may include RAM or ROM. A preprocessing algorithm for detecting an object in an image, a background extraction algorithm, a feature extraction algorithm, and an object detection algorithm may be stored in the storage device 1340. In addition, although not shown in FIG. 4, the communication device 1320 may further include various sensor devices (for example, an ultrasound sensor, LIDAR, radar, a sensor such as an infrared sensor for measuring a distance to an object and/or a position of the object, a camera for capturing an image, an infrared camera, and a stereo camera).

An embodiment of the present invention may be implemented as a method executed in a computer, or may be implemented as a non-transitory computer-readable medium storing instructions executable by a computer. In one embodiment, when executed by a processor, a computer-readable instruction may perform a method according to at least one aspect of the present invention. Also, the method according to an embodiment of the present invention may be implemented in a program instruction form executable by various computer means and may be recorded in a computer-readable medium. The computer-readable medium may include a program instruction, a data file, a data structure, or a combination thereof. A program instruction recorded in the computer-readable medium may be specially designed and constructed for an embodiment of the present invention, or may be known to and available by those skilled in the computer software field. The computer-readable medium may include a hardware device which is configured to store and execute a program instruction. For example, the computer-readable medium may be a magnetic media such as a hard disk, a floppy disk, or a magnetic tape, an optical media such as CD-ROM or DVD, a magneto-optical media such as a floptical disk, ROM, RAM, or flash memory. The program instruction may include a high-level language code executable by a computer through an interpreter, in addition to a machine language code such as being constructed by a compiler.

As described above, in the software architecture of the common use of the Wayland protocol according to the present invention, because two conventional IPC layers (for example, the GDBus layer 130 and the Wayland protocol layer 160) are integrated into one IPC layer (for example, the Wayland protocol layer 160'), undesired events associated with a plurality of IPC call operations and blocking call operations performed in changing a screen may be reduced, and the occurrence of delay caused by a non-blocking call operation may be prevented.

Moreover, the Weston layer 170' may further include a WindowPolicyManager module 178 which generalizes, defines, and manages the policy of Window which differs in each AP, and thus, a user may flexibly respond to the addition of a new function and the cost for changing a version may be reduced.

According to the present invention, a common-use graphics interface for defining functions of App and a graphics-linked service implemented by a display electronic device included in vehicles may be designed, and the common use of a graphics protocol for communication between a graphics module, a link service, and App may be implemented.

Moreover, a module (WindowPolicyManager) which manages and sets the policy of Window in Weston may be designed and implemented, and a module (WindowManagerService) which designs a module for executing a function on the basis of the policy of Window may be designed and implemented.

Accordingly, the competitiveness of SW development may be reinforced through development for the common use of a graphics module, a solution of own company may be secured based on WindowPolicyManager and WindowManagerService added to the inside of Weston, and a response time needed for maintenance may be reduced based on a difference in each AP. Also, flexibility for adding a new function through reconfiguration of SW architecture may be secured, and a design structure and performance enhancement for mass production may be secured.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of implementing a software architecture for common use of a Wayland protocol in a graphics module including an application layer, an application programming interface (API) layer, a GDBus layer, a layout service layer, a Wayland protocol layer, a Weston layer, and a kernel layer, the method comprising:
    integrating the GDBus layer, relaying communication between the API layer and the layout service layer, into the Wayland protocol layer relaying communication between the layout service layer and the Weston layer;
    changing the layout service layer, providing a service of determining and managing an application to be displayed on a screen, to a WindowManagerService module performing a function based on a Window policy, wherein changing of the layout service layer comprises:
        implementing the WindowManagerService module to have a function-based function structure provided in the layout service layer; and
    adding the implemented WindowManagerService module to the Weston layer; and
    adding a WindowPolicyManager module, generalizing, defining, and managing the Window policy, which differs for each manufacturer, to the Weston layer.

2. The method of claim 1, wherein integrating the GDBus layer comprises adding a GDBus interface of the GDBus layer to the Wayland protocol layer.

3. The method of claim 2, wherein, as the GDBus interface is added to the Wayland protocol layer, the GDBus layer is removed from the graphics module.

4. The method of claim 3, wherein, as the WindowManagerService module is implemented to have a function-based function structure provided in the layout service layer, the layout service layer is removed in the graphics module.

5. A non-transitory computer storage medium storing a graphics module based on Wayland and Weston and implemented with a software architecture for common use of a Wayland protocol, including an application layer module, an application programming interface (API) layer module, a Wayland protocol layer module, a Weston layer module, and a kernel layer module, the graphics module comprising:
    the Wayland protocol layer module being an inter-process communication (IPC) for relaying a communication between the API layer module and the Weston layer module and including a GDBus interface, and
    the Weston layer module includes a WindowManagerService module including a module configured to execute a function based on a Window policy, wherein the Weston layer module further comprises a WindowPolicyManager module configured to generalize, define, and manage the Window policy, which differs for each manufacturer, and wherein the WindowManagerService module is:
        a module into which a layout service layer module designed in a conventional graphics module based on Wayland and Weston is integrated, and
        implemented to have a function-based function structure provided in the layout service layer module.

6. The graphics module of claim 5, wherein the Window policy comprises policies associated with screen updating, touch recognition, and key event recognition which differ in each manufacturer.

7. The graphics module of claim 5, wherein the Wayland protocol layer module is a module integrated into a GDBus layer module, which relays a communication between a layout service layer module and the API layer module designed in a conventional graphics module based on Wayland and Weston.

* * * * *